United States Patent
Huang

(10) Patent No.: US 8,768,109 B2
(45) Date of Patent: Jul. 1, 2014

(54) LOW POWER ELECTRO-OPTIC MODULATOR

(71) Applicant: Hsin-Shun Huang, New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/660,025

(22) Filed: Oct. 25, 2012

(65) Prior Publication Data

US 2013/0343692 A1   Dec. 26, 2013

(30) Foreign Application Priority Data

Jun. 21, 2012   (TW) .............................. 101122161 A

(51) Int. Cl.
   *G02F 1/035*   (2006.01)
(52) U.S. Cl.
   USPC .................................................. 385/2; 385/3

(58) Field of Classification Search
   USPC ......................................................... 385/2, 3
   See application file for complete search history.

(56) References Cited

U.S. PATENT DOCUMENTS

| 7,167,607 B2 * | 1/2007 | Kim et al. .......................... 385/3 |
| 2004/0052442 A1 * | 3/2004 | Li et al. ............................. 385/3 |

* cited by examiner

*Primary Examiner* — Omar Rojas
(74) *Attorney, Agent, or Firm* — Novak Druce Connolly Bove + Quigg LLP

(57) ABSTRACT

An electro-optic modulator includes a substrate, a pair of transmission lines, a first strip-shaped electrode, and a pair of second strip-shaped electrodes. The substrate includes a surface and a reversely-polarized portion. The transmission lines are formed in the surface and extend substantially in parallel with each other. One of the transmission lines is formed within the reversely-polarized portion and the other is out of the reversely-polarized portion. The first strip-shaped electrode is formed on the surface and covers the transmission lines. The second strip-shaped electrodes are positioned at two sides of the first strip-shaped electrodes and parallel with the first strip-shaped electrode.

8 Claims, 2 Drawing Sheets

LOW POWER ELECTRO-OPTIC MODULATOR

BACKGROUND

1. Technical Field

The present disclosure relates to high-speed telecommunication technologies, and particularly to a low power electro-optic modulator for use in high-speed telecommunication.

2. Description of Related Art

Electro-optic modulators include a substrate, a waveguide, and electrodes. The waveguide is implanted in the substrate. A drive voltage is applied to the electrodes to form electric modulating fields. The electric modulating fields effect a change in the refractive index of the waveguide and thus alter a phase of lightwaves traversing the waveguide, which is known as the electro-optic effect, thus permitting modulation of an output optical signal from the waveguide. However, a power consumption of the electro-optic modulator is often less satisfactory as the electrodes are not reasonably configured.

Therefore, it is desirable to provide an electro-optic modulator, which can overcome the above-mentioned shortcomings.

DETAILED DESCRIPTION

Embodiments of the disclosure will be described with reference to the accompanying drawings.

Figure 1:
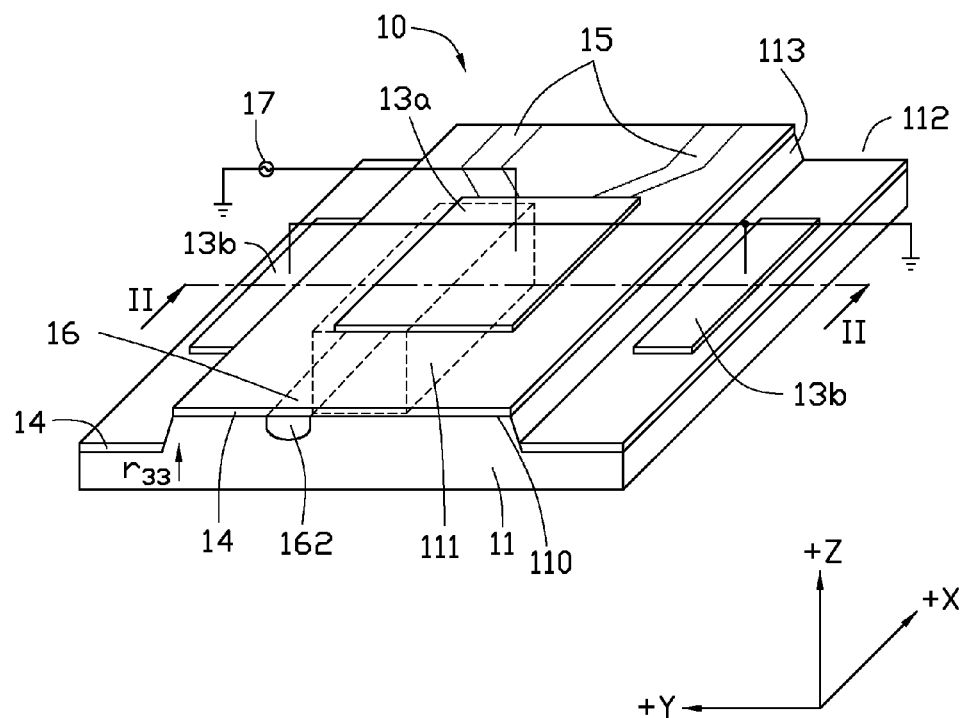
FIG. 1 is an isometric schematic view of an electro-optic modulator, according to an embodiment.
Figure 2:
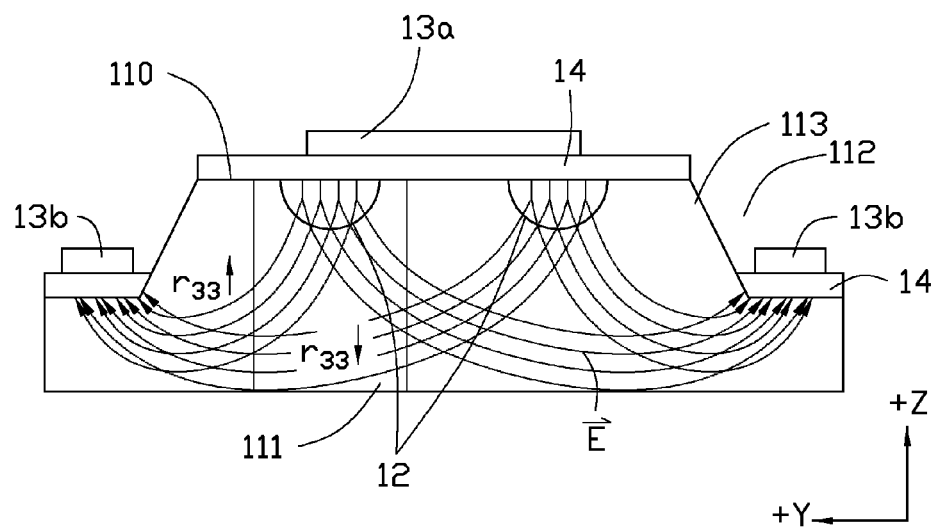
FIG. 2 is a cross-sectional view taken along a line II-II of FIG. 1.

Referring to FIGS. 1-2, an embodiment of an electro-optic modulator 10 includes a crystal substrate 11, a pair of transmission lines 12, a first electrode 13a, and a pair of second electrodes 13b. The crystal substrate 11 includes a first surface 110 and a reversely-polarized portion 111. The transmission lines 12, such as coplanar optical waveguides, are embedded in the crystal substrate 11 by metal diffusion and extend substantially parallel to each other. One of the transmission lines 12 is formed within the reversely-polarized portion 111 and the other is out of the reversely-polarized portion 111. The first electrode 13a is strip shaped and formed on the first surface 110, and covers the transmission lines 12. The second electrodes 13b are strip shaped and positioned on two sides of the first electrode 13a, parallel with the first electrode 13a.

In operation, a drive voltage is applied to the first electrode 13a and the second electrodes 13b to form an electric modulating field E. That is, a polarity of the first electrode 13a opposes to the polarity of the second electrodes 13b. The electric modulating field E changes the refractive index of the transmission lines 12 and thus alters phases of lightwaves traversing the transmission lines 12. As such, lightwaves traversing the transmission lines 12 have different phases and result in constructive/destructive interference therebetween, permitting modulation of output optical signals from the transmission lines 12.

According to the principle of the electro-optic effect, the drive voltage $$V_\pi = k \frac{\lambda G}{n^3 r \Gamma L},$$

wherein k is a constant coefficient, $\lambda$ is a working wavelength of the lightwaves, G is a gap between the transmission lines 12, n is an effective linear part of the refractive index of the crystal substrate 11, r is an electro-optic coefficient of the crystal substrate 11 of a crystal axis that is parallel with the electric modulating field E, $\Gamma$ is a filed interaction factor which quantifies a strength of non-linear electric-optic interaction of the electric modulating field E and an optical field in the transmission line 12 in a cross-section of the transmission line 12, and L is a length of the transmission line 12. That is, the drive voltage $V_\pi$ is inversely proportional to the field interaction factor $\Gamma$.

The field interaction factor $\Gamma$ is proportional to an overlap between the electric modulating field E and the optical field in the cross section of the transmission line 12. As the lightwaves is limited within the transmission line 12, the maximum overlap is the cross-section of the transmission lines 12. In the embodiment, by constructing and arranging the first electrode 13a and the second electrodes 13b as above-described, the electric modulating field E passes the whole cross-section of the transmission line 12. As such, the overlap approaches the maximum value and accordingly the field interaction factor $\Gamma$ approaches the maximum value. Thereby, the drive voltage $V_\pi$ can be reduced to the minimum extent, and a power consumption of the electro-optic modulator 10 is reduced correspondingly.

In addition, to modulate the lightwaves traversing the transmission lines 12, it requires that the phase of the lightwaves in one of the transmission lines 12 opposes to the phase of the lightwaves in the other transmission line 12. Conventionally, this is achieved by arranging two electrodes of opposite polarities on the respective transmission lines 12. However, as the transmission lines 12 are typically adjacent to each other, it is difficult to arrange the electrodes. In addition, the electrodes readily form short circuit. In contrast, in this embodiment, by employing the reversely-polarized portion 111, the phase of the lightwaves in the transmission line 12 that is formed within the reversely-polarized portion 111 already opposes to the phase of the lightwaves in the other transmission line 12 that is out of the reversely-polarized portion 111. As such, the electro-optic modulator 10 can use one electrode, i.e., the first electrode 13a, instead of two electrodes of opposite polarities which are used in conventional electro-optic modulators.

The crystal substrate 11 can be made from lithium niobate (LiNbO$_3$) to increase the bandwidth of the electro-optic modulator 10 as the LiNbO$_3$ has a relative quick response speed.

In manufacturing the substrate 11, a forwardly-polarized external electric field is applied to the crystal substrate 11 during the growing (i.e., crystallizing) of the crystal substrate 11. As such, lithium atom is dragged to surfaces of the substrate 11 and the substrate is polarized as charges in the substrate 11 are not evenly distributed. Then, a reversely-polarized electric field is applied to the crystal substrate 11, at a portion of the substrate 11 which is designated to be the reversely-polarized portion 111. Directions of the forwardly-polarized electric field and the reversely-polarized electric field oppose to each other and are both parallel with a height direction of the substrate 11. Generally, the reversely-polarized electric filed is higher than 21 kV/mm but can be set depending on need. Both the substrate 11 and the reversely-polarized portion 111 are generally cuboid. A length and a height of the reversely-polarized portion 111 are equal to a length and a height of the substrate 11, respectively. However, a width of the reversely-polarized portion 111 is greatly smaller than a width of the substrate 11.

The transmission lines 12 constitute a directional coupler. The electric-optic modulator 10 can be a ridge-type directional coupler to increase couple efficiency, improve mismatch between wave speeds of the electric modulating field E and the optical field, and increase the field interaction factor Γ. In the embodiment, the substrate 11 is substantially cubic and defines two cutouts 112 in the first surface 110 at two sides of the transmission lines 12, to from a ridge 113 between the cutouts 112. The transmission lines 12 and the first electrode 13a are positioned on the ridge 113 of the substrate 11. The second electrodes 13b are positioned on bottom surfaces of the cutouts 112.

As the drive voltage $V_\pi$ is inversely proportional to the electro-optic coefficient of the substrate 11 of the crystal axis that is parallel to the electric modulating field E, and the electro-optic coefficient of the $LiNbO_3$ of +Z crystal axis $r_{33}$ is the maximum one ($30.8 \times 10^{-12}$ m/V), the electro-optic modulator 10 is +Z cut. That is, the +Z crystal axis of the $LiNbO_3$ substrate 11 is substantially parallel with the electric modulating field E.

The electro-optic modulator 10 also includes an isolating layer 14 on the first surface 110 and the bottom surfaces of the cutouts 112 to further improve mismatch of the wave speeds of the electric modulating field E and the optical field. The first electrodes 13a and the second electrodes 13b are positioned on the isolating layer 14. The isolating layer 14 can be dioxide silicon ($SiO_2$).

Each of the transmission lines 12 has a semi-cylinder configuration and an output section 15 extending out from one end thereof and for coupling an optical fiber (not shown). One of the transmission lines 12 has an input section 16 extending from another end thereof opposite to the corresponding output section 15 and forms an entrance 162 at a side of the substrate 11.

The first electrode 13a and the second electrodes 13b are connected to a direct current (DC) or a low-frequency power source 17 and thus have the opposite polarities.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electro-optic modulator, comprising:
a substrate comprising a surface and a reversely-polarized portion;
a pair of transmission lines embedded in the surface and extending substantially in parallel with each other, one of the transmission lines being formed within the reversely-polarized portion and the other being out of the reversely-polarized portion, wherein each of the transmission lines has a semi-cylinder configuration and an output section extending out from one end of the transmission line, the output sections diverge, and only one of the transmission lines has an input section extending from another end of the transmission line opposite to the corresponding output section and forms an entrance at a side of the substrate;
a first strip-shaped electrode formed on the surface and covering the transmission lines; and
a pair of second strip-shaped electrodes positioned at two sides of the first strip-shaped electrode and parallel with the first strip-shaped electrode.

2. The electro-optic modulator of claim 1, wherein the substrate is made from lithium niobate.

3. The electro-optic modulator of claim 1, wherein the substrate and the reversely-polarized portion are cuboid, a length and a height of the reversely-polarized portion are equal to a length and a height of the substrate, respectively, and a width of the reversely-polarized portion is smaller than a width of the substrate.

4. The electro-optic modulator of claim 2, wherein the electric-optic modulator is a ridge-type directional coupler, the substrate is substantially cuboid and defines two cutouts in the surface, at two sides of the transmission lines, to form a ridge between the cutouts, the transmission lines and the first strip-shaped electrode are positioned on the ridge of the substrate, and the second strip-shaped electrodes are positioned on bottom surfaces of the cutouts, respectively.

5. The electro-optic modulator of claim 4, wherein the electro-optic modulator is +Z cut.

6. The electro-optic modulator of claim 4, wherein the electro-optic modulator comprises an isolating layer on the surface and the bottom surfaces of the cutouts, and the first strip-shaped electrode and the second strip-shaped electrodes are positioned on the isolating layer.

7. The electro-optic modulator of claim 6, wherein the isolating layer is made from dioxide silicon.

8. The electro-optic modulator of claim 1, wherein the transmission lines are coplanar optical waveguides formed by metal diffusion.

* * * * *